(12) United States Patent
Grass et al.

(10) Patent No.: US 12,421,415 B2
(45) Date of Patent: Sep. 23, 2025

(54) USE OF BIS(2-ETHYLHEXYL) CYCLOHEXANE-1,4-DICARBOXYLATE AS PLASTICIZER IN SURFACE COVERINGS

(71) Applicant: Evonik Oxeno GmbH & Co. KG, Marl (DE)

(72) Inventors: Michael Grass, Haltern am See (DE); Imke Schulz, Lüdinghausen (DE); Carsten Gehlen, Marl (DE)

(73) Assignee: Evonik Oxeno GmbH & Co. KG, Marl (DE)

( * ) Notice: Subject to any disclaimer, the term of this patent is extended or adjusted under 35 U.S.C. 154(b) by 331 days.

(21) Appl. No.: 17/587,106

(22) Filed: Jan. 28, 2022

(65) Prior Publication Data

US 2022/0259451 A1    Aug. 18, 2022

(30) Foreign Application Priority Data

Feb. 16, 2021   (EP) .................... 21157273

(51) Int. Cl.
*C09D 127/06* (2006.01)
*D06N 3/00* (2006.01)
*D06N 3/06* (2006.01)

(52) U.S. Cl.
CPC .......... *C09D 127/06* (2013.01); *D06N 3/0061* (2013.01); *D06N 3/06* (2013.01); *D06N 2211/066* (2013.01); *D06N 2211/28* (2013.01)

(58) Field of Classification Search
CPC ...... C09D 127/06; C09D 7/63; D06N 3/0061; D06N 3/06; D06N 2211/066; D06N 2211/28; D06N 3/18; C08J 9/0023; C08J 9/30; C08J 2327/06; B32B 2255/02; B32B 2255/12; B32B 2255/26; B32B 2255/28; B32B 2260/021; B32B 2260/046; B32B 5/245; B32B 29/007; B32B 2262/0276; B32B 2262/101; B32B 2264/102; B32B 2264/1021; B32B 2264/1027; B32B 2264/104; B32B 2307/4023; B32B 2307/412; B32B 2471/00; B32B 5/022;
(Continued)

(56) References Cited

U.S. PATENT DOCUMENTS 7,208,545 B1   4/2007   Brunner et al.
10,501,392 B2   12/2019   Fridag et al.
(Continued)

FOREIGN PATENT DOCUMENTS

EP   3 211 029 A1   8/2017
WO   2000/078704   12/2000
(Continued)

OTHER PUBLICATIONS

Anton et al., U.S. Appl. No. 17/547,330, filed Dec. 10, 2021.
(Continued)

*Primary Examiner* — Nathan L Van Sell
(74) *Attorney, Agent, or Firm* — Grüneberg and Myers PLLC

(57) ABSTRACT

The invention provides multilayer surface coverings each having a layer obtained from a filler-containing PVC plastisol and obtained from a filler-free PVC plastisol, each of which comprises a plasticizer composition comprising bis (2-ethylhexyl) cyclohexane-1,4-dicarboxylate. Such surface coverings may be used as floor coverings or as imitation leather.

22 Claims, 2 Drawing Sheets

(58) Field of Classification Search
CPC ... B32B 5/024; B32B 2266/0235; B32B 5/20; B32B 5/02; B32B 27/10; B32B 27/12; B32B 27/308; B32B 27/40; B32B 29/00; B32B 33/00; B32B 5/18; B32B 27/06; B32B 27/304; B32B 27/32; C08K 3/22; C08K 3/26; C08K 3/30; C08K 3/34; C08K 3/36; C08K 2003/2206; C08K 2003/222; C08K 2003/265; C08K 2003/267; C08K 2003/3045; C08K 5/0016; C08K 5/12; C08K 3/013; E04F 15/105; E04F 15/107; Y10S 428/904
See application file for complete search history.

(56) References Cited

U.S. PATENT DOCUMENTS

| | | | |
|---|---|---|---|
| 10,787,414 | B2 | 9/2020 | Boeck et al. |
| 2013/0303640 | A1* | 11/2013 | Kim ............... C08K 5/0016 521/73 |
| 2015/0375471 | A1* | 12/2015 | Song ............... E04F 13/0885 156/304.3 |
| 2016/0326346 | A1 | 11/2016 | Gourdin et al. |
| 2017/0313848 | A1* | 11/2017 | Pfeiffer ............... C08K 5/11 |
| 2018/0127987 | A1* | 5/2018 | Bradway ............ D06N 7/0076 |
| 2021/0179534 | A1 | 6/2021 | Schulz et al. |
| 2021/0206972 | A1 | 7/2021 | Schulz et al. |

FOREIGN PATENT DOCUMENTS

| | | |
|---|---|---|
| WO | 03/029339 A1 | 4/2003 |
| WO | 2015/101569 A1 | 7/2015 |
| WO | 2020/070646 | 4/2020 |

OTHER PUBLICATIONS

Kraft et al., U.S. Appl. No. 17/543,261, filed Dec. 6, 2021.
European Search Report mailed on Aug. 23, 2021 in EP 21157273.0 (7 pages).
Kano et al., "Industrial sheet materials made of soft vinyl chloride resin composition containing a (meth)acrylate compound," Chemical Abstracts Service, copyright Dec. 2015, XP002803783 (4 pages).

* cited by examiner

USE OF BIS(2-ETHYLHEXYL) CYCLOHEXANE-1,4-DICARBOXYLATE AS PLASTICIZER IN SURFACE COVERINGS

CROSS REFERENCE TO RELATED APPLICATIONS

This application is a 35 U.S.C. § 119 patent application which claims the benefit of European Application No. 21157273.0 filed Feb. 16, 2021, which is incorporated herein by reference in its entirety.

FIELD

The present invention relates to multilayer surface coverings each having at least one layer obtained from a filler-containing PVC plastisol and obtained from a filler-free PVC plastisol, each of which comprises a plasticizer composition comprising bis(2-ethylhexyl) cyclohexane-1,4-dicarboxylate (also 1,4-DEHCH hereinafter). Such surface coverings may be used as floor coverings or as imitation leather.

BACKGROUND

Multilayer surface coverings, especially floor coverings and imitation leathers, are known and are produced on an industrial scale. Such surface coverings consist of multiple layers. At least some of the layers consist predominantly of polyvinylchloride (PVC), to which plasticizers must be added in order to improve properties such as extensibility and processability. The best-known plasticizer for PVC in Europe, which is also considered to be the standard for applications in floor coverings and imitation leathers, is diisononyl phthalate (DINP). DINP features acceptable gelation characteristics, moderate viscosity and, in particular, low volatility. A low volatility in particular is important in the applications mentioned in order to reduce emissions during production or in the final product. During the production of the flexible PVC articles, on account of the high processing temperatures, the plasticizer would at least partly evaporate and then condense at colder sites and/or drip off, and hence lead to soiling, which then necessitates production shutdowns from time to time, and this can lead to economic detriments.

It is the case that DINP is one of the global standards. Market demands are also leading to ever greater use of phthalate-free plasticizers (cf. U.S. 2016/0326346 A1). One of the most important phthalate-free plasticizers is diisononyl cyclohexane-1,2-dicarboxylate (1,2-DINCH). Terephthalates, for example di-2-ethylhexyl terephthalate (DEHT or DOTP), are likewise possible high-volume alternatives for phthalates or in particular DINP, but these have experienced recurrent problems of acceptance in public perception because they are counted as part of the phthalate family. However, these two plasticizer classes have a lower gelation speed and a higher volatility compared to DINP. In order to compensate for the weakness of gelation, it is necessary to add fast gelators. But fast gelators are generally of relatively high volatility and hence increase the process volatility of the overall plasticizer composition. Furthermore, the additional use of a fast gelator increases formulation costs since they are generally relatively costly.

SUMMARY

It was the object of the present invention to provide a multilayer surface covering in which the PVC plastisol layers present include an advantageous plasticizer composition.

DETAILED DESCRIPTION

Figure 1:
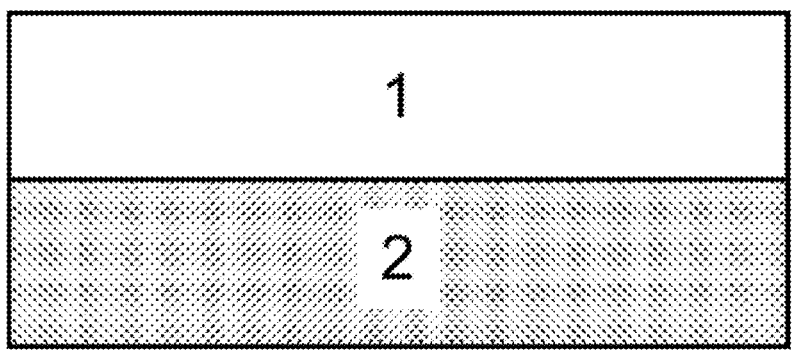
FIG. 1 shows a multilayer surface covering including a layer obtained from a filler-containing PVC plastisol (2) and at least one layer obtained from a filler-free PVC plastisol (1).

The object was achieved by the inventive multilayer surface covering according to claim 1. Preferred configurations of the present invention are specified in the subsidiary claims. Such a surface covering is a multilayer surface covering comprising at least one layer obtained from a filler-containing PVC plastisol comprising PVC, a filler and a plasticizer composition, and at least one layer obtained from a filler-free PVC plastisol comprising PVC and a plasticizer composition, characterized in that the plasticizer composition in the filler-containing PVC plastisol and in the filler-free PVC plastisol respectively contains bis(2-ethylhexyl) cyclohexane-1,4-dicarboxylate (1,4-DEHCH).

This plasticizer composition according to the invention results in an improvement in overall performance compared to other cyclohexanedicarboxylic esters or mixtures of these esters when used in plastisols. It is thus possible to achieve the target gelation speed of DINP even without addition of fast gelators. Moreover, plastisols comprising the plasticizer composition according to the invention have a distinct reduction in viscosity compared to plastisols comprising DINP, which either leads to faster or easier spreading of the plastisol and/or can also advantageously be utilized for reduction of formulation costs because the filler content can be increased. Compared to other cyclohexanedicarboxylic esters (e.g. 1,4-DINCH, 1,2-DINCH, 1,2-DEHCH), gelation speed is increased, which can lead to a higher processing speed or lower energy input on processing.

The wording "layer obtained from" in the context of this invention means that the respective layer is obtained from the corresponding plastisol composition. For the production of the surface coverings according to the invention, the plastisols presented here are used in liquid or free-flowing form, applied layer by layer via a spreading method, and then repeatedly pre-gelated at temperatures sufficient neither for complete gelation nor for foaming (100-150° C.), which pre-dries the layers and enables the application of the next layer, and processed to give the end product only in a final step at temperatures of 160-230° C., for example in what is called a "gelation tunnel". In this step, the foaming and the "binding" of the individual layers then also takes place.

The layers of the surface covering according to the invention may in principle be arranged in any sequence. But it is preferable in accordance with the invention that the layer obtained from the filler-containing PVC plastisol is disposed beneath the layer obtained from the filler-free PVC plastisol. Between the two layers obtained from the filler-containing PVC plastisol and obtained from the filler-free PVC plastisol, there may be one or more further layers and/or a carrier material, for example polyester fabric, glass nonwoven, paper or board. The carrier material may preferably also be present at a site within the filler-containing layer.

The filler-containing PVC plastisol contains, aside from the PVC, a filler and a plasticizer composition. Different types of PVC may be used as PVC for the filler-containing PVC plastisol. The PVC in the filler-containing PVC plastisol is preferably a paste PVC, an extender PVC or a mixture of two or more of the PVC types mentioned. In an alternative embodiment, the PVC is a mixture of two or more paste PVCs.

The difference between a paste PVC and an extender PVC is typically the manner of production and the resulting particle size of the PVC particles formed. A paste PVC may be produced by emulsion polymerization or microsuspension polymerization, which affords particles of PVC that typically have a particle diameter of 1 to 40 µm. An extender PVC may be produced by suspension polymerization. The resultant agglomerated particles of PVC normally have a particle diameter of 80 to 200 µm. One effect of the addition of an extender PVC is to lower the viscosity level of the plastisol even in the case of a low plasticizer content, which makes it easier for the plastisols to spread.

The exact composition is fundamentally variable and can be tailored to the corresponding application. For the surface covering according to the invention, it is preferable that the filler-containing PVC plastisol contains the plasticizer composition in a proportion of 35 to 80 parts by mass per 100 parts by mass, preferably 40 to 75 parts by mass per 100 parts by mass, of PVC. The plasticizer composition contains bis(2-ethylhexyl) cyclohexane-1,4-dicarboxylate (1,4-DEHCH), but may also contain one or more further plasticizers. Corresponding plasticizers are known to those skilled in the art. 1,4-DEHCH is present in the plasticizer composition especially in a proportion of at least 50% by weight, preferably at least 65% by weight and further preferably at least 80% by weight, based in each case on the overall plasticizer composition. In a particularly preferred embodiment, the plasticizer composition for the filler-containing PVC plastisol consists exclusively of 1,4-DEHCH.

The filler-containing PVC plastisol for the multilayer surface covering according to the invention contains the filler preferably in a proportion of 50 to 200 parts by mass per 100 parts by mass of PVC, preferably 70 to 180 parts by mass per 100 parts by mass of PVC, more preferably 85 to 170 parts by mass per 100 parts by mass of PVC. Suitable fillers for surface coverings are known to those skilled in the art. Preferred fillers that may be used in the filler-containing PVC plastisol in the context of the invention are calcium carbonate, magnesium carbonate, alumina, calcium silicate, talc, calcium sulfate, calcium oxide, magnesium oxide, aluminium silicates, dolomite, silicon oxide and kieselguhr. Particular preference is given to calcium carbonate and magnesium carbonate.

The filler-containing PVC plastisol may additionally contain additives as well as the ingredients mentioned. Examples of additional additives are rheological additives with which the viscosity of the plastisol can be reduced, and also epoxidized vegetable oils, such as epoxidized soybean oil (ESBO) as costabilizers, and also thermal stabilizers or deaerators with which surface tension can be lowered, in order to be able to more easily remove air bubbles formed in the production of the plastisol from the plastisol. Examples of rheological additives are the products available under the trade names VISCOBYK®-5120, VISCOBYK®-5130 and VISCOBYK®-4041. Known deaerators are methylalkylpolysiloxanes (obtainable, for example, under the BYK®-3105 trade name) or polyalkylene derivatives (obtainable, for example, under the BYK®-3155 trade name). Preferred deaerators are silicone-free. Suitable thermal stabilizers are lead salts, organotin compounds, barium/zinc compounds, cadmium compounds or zinc compounds, calcium/zinc stabilizers and organic-based stabilizers ("OBS"). Preferred thermal stabilizers are barium/zinc compounds, calcium/zinc stabilizers and organic-based stabilizers ("OBS"). The additives may each individually be present in the plastisol in an amount of up to 15 parts by mass per 100 parts by mass of PVC.

The multilayer surface covering may also comprise a carrier material. Various materials may be used as carrier materials for the surface coverings described here. The carrier material for the multilayer surface covering preferably consists of a polyester fabric, of a glass nonwoven, of paper or of board. If a carrier material is present, it is coated with the filler-containing PVC plastisol at least on the top side, i.e. on one side. This especially relates to paper and board. As a result of the coating, the free-flowing plastisol composition will penetrate into the structure of the carrier material. The carrier material, in the context of the present invention, thus forms part of the layer obtained from a filler-containing PVC plastisol. The carrier material is preferably coated with the filler-containing PVC plastisol on both sides, i.e. on the top side and the bottom side, which can also be accomplished in one step. This results in impregnation of the carrier material with the filler-containing PVC plastisol. The carrier material is then present in the layer obtained from a filler-containing PVC plastisol.

The filler-free PVC plastisol, aside from the PVC, also contains at least a plasticizer composition. In accordance with its name, the filler-free PVC plastisol does not contain any filler, i.e. any substance that can be regarded as a filler. The layer obtained from the filler-free PVC plastisol is preferably transparent. Different types of PVC may be used as PVC for the filler-free PVC plastisol. The PVC in the filler-free PVC plastisol is preferably a paste PVC, an extender PVC or a mixture of two or more of the PVC types mentioned. In an alternative embodiment, the PVC is a mixture of two or more paste PVCs. The definition and the differences between paste PVCs and extender PVCs have already been illustrated above.

For the filler-free PVC plastisol, it is preferable that it contains at least one paste PVC and at least one extender PVC. The amounts of paste PVC and extender PVC may be varied within wide ranges and matched to the demands of the respective application. In a preferred embodiment, the paste PVC is present in an amount of 40% to 80% by weight and the extender PVC in an amount of 20% to 60% by weight, based in each case on the total amount of PVC in the filler-free PVC plastisol. It will be apparent that the amounts of paste PVC and extender PVC must add up to 100% by weight.

The composition of the filler-free PVC plastisol is fundamentally variable and can be tailored to the corresponding application. For the surface covering according to the invention, it is preferable that the filler-free PVC plastisol contains the plasticizer composition comprising 1,4-DEHCH in a proportion of 15 to 40 parts by mass per 100 parts by mass of PVC. The plasticizer composition contains bis(2-ethylhexyl) cyclohexane-1,4-dicarboxylate (1,4-DEHCH), but may also contain one or more further plasticizers. Corresponding plasticizers are known to those skilled in the art.

1,4-DEHCH is present in the plasticizer composition especially in a proportion of at least 50% by weight, preferably at least 65% by weight and further preferably at least 80% by weight, based in each case on the overall plasticizer composition. It is preferable in accordance with the invention that the plasticizer composition for the filler-free PVC plastisol, as well as 1,4-DEHCH, comprises a fast gelator. The fast gelator may be present in the filler-free PVC plastisol in a proportion of up to 15 parts by mass per 100 parts by mass of PVC. Suitable fast gelators are glycol dibenzoates, dibutyl or dipentyl terephthalates, 2-ethylhexyl, isononyl or isodecyl benzoates, tributyl citrate, acetyltributyl citrate or hydrogenated phthalic or terephthalic esters having C4 to C7 alkyl chains.

The filler-free PVC plastisol may additionally contain additives as well as the ingredients mentioned. Examples of additional additives are rheological additives with which the viscosity of the plastisol can be reduced. Examples of known rheological additives are the products available under the trade names VISCOBYK®-5120, VISCOBYK®-5130 and VISCOBYK®-4041. The additives may be present in the filler-free PVC plastisol in a proportion of 3 to 12, preferably 4 to 10, parts by mass per 100 parts by mass of PVC.

In addition, the filler-free PVC plastisol may comprise one or more thermal stabilizer(s). Suitable thermal stabilizers are lead salts, organotin compounds, barium/zinc compounds, cadmium compounds or zinc compounds, calcium/zinc stabilizers and organic-based stabilizers ("OBS"). Preferred thermal stabilizers are barium/zinc compounds, calcium/zinc stabilizers and organic-based stabilizers ("OBS"). The proportion of the stabilizer(s) in the filler-free PVC plastisol is preferably 1 to 4 parts by mass per 100 parts by mass of PVC.

The multilayer surface covering according to the present invention may have further layers as well as the layers already mentioned. For instance, the surface covering may have, on the reverse side, an additional foamed layer obtained from a foamable PVC plastisol. Such a layer can improve acoustic properties. In the case of a floor covering, such a layer obtained from a foamed PVC plastisol may be used for deadening of footfall sound.

The additional foamed layer obtained from a foamable PVC plastisol especially comprises PVC, a plasticizer composition comprising at least bis(2-ethylhexyl) cyclohexane-1,4-dicarboxylate (1,4-DEHCH), one or more fillers, a blowing agent, a kicker, and optionally one or more additional additives. The plasticizer composition of the additional foamed layer of a foamable PVC plastisol may additionally comprise a fast gelator. Suitable fast gelators are glycol dibenzoates, dibutyl or dipentyl terephthalates, 2-ethylhexyl, isononyl or isodecyl benzoates, tributyl citrate, acetyltributyl citrate or hydrogenated phthalic or terephthalic esters having C4 to C7 alkyl chains.

The composition of the additional foamed layer obtained from a foamable PVC plastisol is fundamentally variable and can be tailored to the corresponding application. For the surface covering according to the invention, it is preferable that the additional layer of foamed PVC plastisol contains the plasticizer composition comprising 1,4-DEHCH in a proportion of 40 to 80 parts by mass per 100 parts by mass of PVC. The additional layer of foamed PVC plastisol may also contain the filler in a proportion of 70 to 200 parts by mass per 100 parts by mass of PVC.

In order to achieve the desired foaming, one or more blowing agents may be used. Blowing agents break down to form gas (bubbles), which cause the foaming. Examples of known blowing agents include azodicarbonamide, carbonates, hydrogencarbonates or oxybisbenzenesulfonylhydrazide (OBSH). The blowing agent typically has to be used in only relatively small amounts. In principle, however, the amount of blowing agent correlates with the desired level of foaming. The additional foamed layer obtained from a foamable PVC plastisol contains the blowing agent in a proportion of 2 to 5 parts by mass per 100 parts by mass of PVC.

According to the present invention, the breakdown of the blowing agent may be catalyzed by what is called a kicker. Kickers employed are generally zinc-containing compounds. Suitable kickers are, for example, ZnO, $ZnBO_3$, but also Zn salts such as Zn octanoate, NaZn or KZn or MgZn compounds. The kicker is typically used in a small amount, but the type and amount also has a crucial influence on the speed of breakdown of the blowing agent and hence on the amount of gas bubbles formed during the time-limited foaming process, which cause the foaming. The additional layer of foamed PVC plastisol may therefore preferably contain the kicker in a proportion of 1 to 5 parts by mass per 100 parts by mass of PVC.

The additional foamed layer obtained from a foamable PVC plastisol may additionally contain additives as well as the ingredients mentioned. Examples of additional additives are rheological additives with which the viscosity of the plastisol can be reduced. Examples of rheological additives are the products available under the trade names VISCOBYK®-5120, VISCOBYK®-5130 and VISCOBYK®-4041. The additives may be present in the foamable PVC plastisol in a proportion of 4 to 10 parts by mass per 100 parts by mass of PVC.

It is optionally possible for the additional foamed layer, in place of an aforementioned chemical breakdown of a blowing agent, to be produced by mechanical foaming, i.e. by stirring-in of air. Rather than kicker and blowing agent, what are called foam stabilizers are added to the corresponding plastisol in this case, and these prevent the air introduced from escaping again and collapsing the foam. Such compounds, generally based on silicones or soaps, are known to the person skilled in the art, for example under the "BYK® 8070" or BYK® 8020 brand name. In a particularly preferred embodiment, this mechanical foam may also be used for impregnation of the carrier material.

In a preferred embodiment of the present invention, the multilayer surface covering according to the invention has a decoration. A decoration in the context of the present invention means a visual and/or tactile configuration, for example by the introduction of (printing) inks and/or the embossing of a pattern. Such a decoration may be applied to and/or embossed on the layer obtained from the filler-containing PVC. But it is also possible for there to be an additional, optionally foamed, decorative layer obtained from a PVC plastisol, onto which the decoration is applied and/or embossed. The additional, optionally foamed, decorative layer obtained from a foamable PVC plastisol especially comprises PVC, a plasticizer composition comprising at least bis(2-ethylhexyl) cyclohexane-1,4-dicarboxylate, a filler and optionally a blowing agent, a kicker and/or one or more additives.

In a particularly preferred embodiment of the present invention, the multilayer surface covering of the present invention comprises a carrier material, at least one layer obtained from a filler-containing PVC plastisol that comprises PVC, a filler and a plasticizer composition, at least one layer obtained from a filler-free PVC plastisol that comprises PVC and a plasticizer composition, and at least one foamed layer of a foamable PVC plastisol that comprises PVC, a plasticizer composition, a filler, a blowing agent and a kicker. The plasticizer composition of each of the PVC plastisols used contains bis(2-ethylhexyl) cyclohexane-1,4-dicarboxylate (1,4-DEHCH). In a particularly preferred embodiment, the multilayer surface covering comprises a further scratch-resistant layer that preferably consists of polyurethane or polyacrylate and is transparent.

Most preferably, the multilayer surface covering contains, between the filler-free layer and the filler-containing layer, a further filler-containing, especially foamed, layer, to which the decoration is applied. Decorative inks can be applied, for example, with the aid of a screenprinting drum in one or more steps (individually for each color used). In this case, the principle of chemical inhibition is often employed, meaning that the printing ink, which may also be a colored PVC plastisol, may include an added inhibitor solution that prevents or slows the breakdown of the blowing agent by chemical complexation of the kicker at the sites at which it is applied to this layer, such that there is only slight foaming, if any, at that site. Suitable inhibitors are commercially available, based, for example, on benzotriazoles or thiourea.

For the surface covering according to the invention, preference is given to particular sequences of the layers. These layer sequences can also be found in the illustrative figures FIG. 1, FIG. 2 and FIG. 3. In the basic embodiment (see FIG. 1), the multilayer surface covering comprises at least one layer obtained from a filler-containing PVC plastisol (2) and at least one layer obtained from a filler-free PVC plastisol (1) that is preferably transparent. The at least one preferably transparent layer obtained from a filler-free PVC plastisol (1) is disposed here above the at least one layer obtained from a filler-containing PVC plastisol (2).

Figure 2:
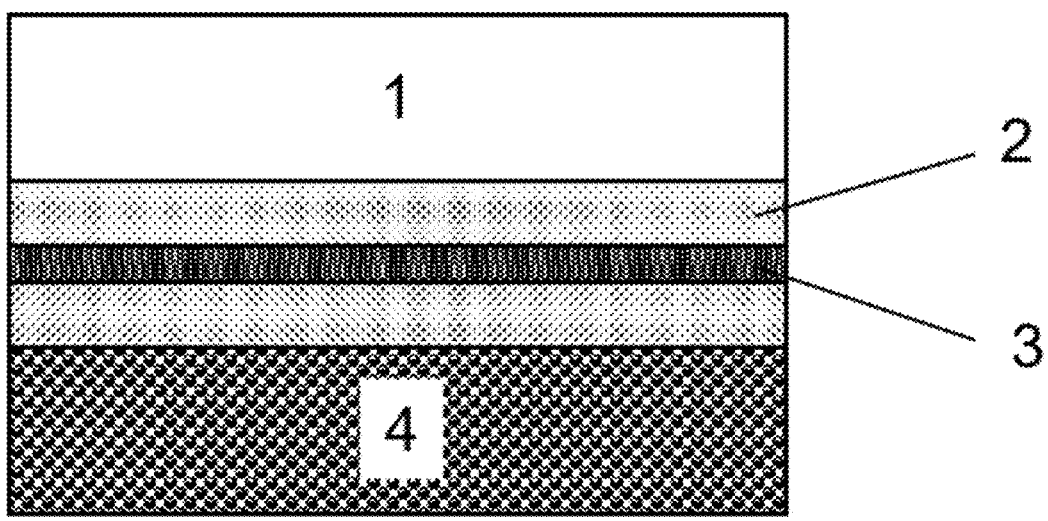
FIG. 2 shows a multilayer surface covering further including a carrier material (3) and a foamed layer obtained from a foamable PVC plastisol (4).

FIG. 2 shows the preferred embodiment, in which, in addition to the at least one preferably transparent layer obtained from a filler-free PVC plastisol (1) and the at least one layer obtained from a filler-containing PVC plastisol (2), there are a carrier material (3) and a foamed layer obtained from a foamable PVC plastisol (4). The carrier material (3) in this embodiment has been coated on both sides with the filler-containing PVC plastisol, and is therefore within the at least one layer obtained from a filler-containing PVC plastisol (2). Beneath this layer (2) is then disposed the foamed layer obtained from a foamable PVC plastisol (4). It would also be conceivable for the carrier material to be coated with the filler-containing PVC plastisol solely on the top side. The carrier material would then directly adjoin the foamed layer obtained from a foamable PVC plastisol (4).

Figure 3:
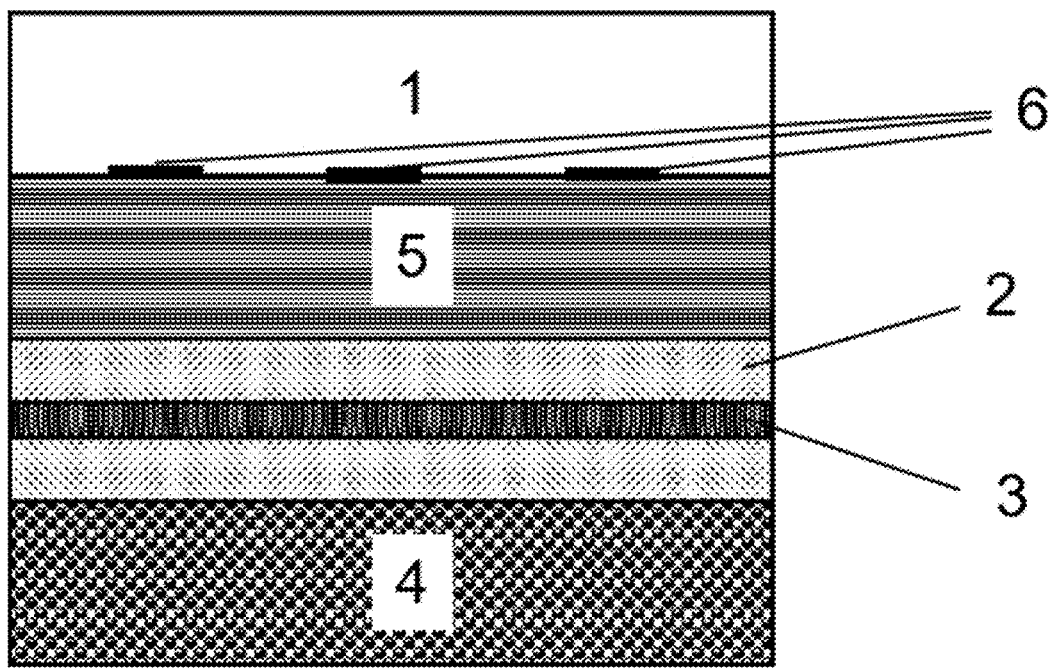
FIG. 3 shows a multilayer surface covering further including a decorative layer (5).

FIG. 3 shows a further-preferred embodiment in which an optionally foamed, decorative layer (5) is additionally present. To this layer is then applied the visual (colored) and/or tactile (e.g. embossing of a pattern) decoration (6). The decorative layer (5) is disposed here between the at least one layer obtained from a filler-containing PVC plastisol (2) and the at least one preferably transparent layer obtained from a filler-free PVC plastisol (1).

In a particularly preferred embodiment, a scratch-resistant layer, preferably of polyurethane or polyacrylate, is also applied to the preferably transparent layer obtained from a filler-free PVC plastisol, in order to increase scratch resistance or abrasion resistance. Any such layer is not shown in the figures.

The multilayer surface coverings according to the present invention can be produced in a manner known to the person skilled in the art by layer-by-layer application of the still free-flowing plastisols, optionally with intermediate drying, for example with the aid of a roll/gelating drum heated to about 100 to 140° C., which leads to partial gelation, i.e. incomplete gelation, such that further application of the next layer is possible without intermerging of the plastisols. The optional intermediate drying can be effected, for example, with what is called a gelating drum, i.e. a roll heated to the desired temperature.

The multilayer surface covering may be utilized for various applications. In a particularly preferred embodiment of the present invention, the surface covering is a floor covering or an imitation leather, and is used for corresponding applications.

The invention is elucidated hereinafter by examples. However, these examples disclose solely illustrative embodiments and should not be regarded as limiting.

Example 1—Plastisol Production

PVC plastisols were produced, as used, for example, for the manufacture of topcoat films (filler-free layer) for floor coverings. The amounts in the plastisol formulations are each given in parts by mass (phr). The formulation is reported in Table 1.

TABLE 1

| Plastisol formulation | |
|---|---|
| | phr |
| PVC (Vestolit P1430 K70 - Ultra; from Vestolit) | 100 |
| Plasticizer or plasticizer mixture | 50 |
| Epoxidized soybean oil as costabilizer (Edenol D81, from Emery Oleochemicals) | 3 |
| Thermal stabilizer based on Ca/Zn (Reagens SLX 781) | 2 |

First the liquid constituents and then the pulverulent constituents were weighed out into a PE beaker. The mixture was stirred manually with a spatula in such a way that no unwetted powder was present any longer. The mixing beaker was then clamped into the clamping device of a dissolver stirrer. After switching on the stirrer, the speed was slowly increased to about 2000 rpm (revolutions per minute). During that time, the plastisol was cautiously deaerated. For this purpose, the pressure was adjusted to a pressure below 20 mbar. As soon as the plastisol had reached a temperature of about 30° C., the speed was lowered to about 350 rpm. Henceforth, the plastisol was deaerated at that speed and a pressure below 20 mbar for 9 minutes. This ensured that there could be no premature partial gelation in the homogenizing of the plastisol.

The following plasticizers or mixtures of the following plasticizers were used in the plastisols:
1,4-DEHCH=bis(2-ethylhexyl) cyclohexane-1,4-dicarboxylate (inventive, Hanwha Chemical Corp., Korea)
1,2-DEHCH=bis(2-ethylhexyl) cyclohexane-1,2-dicarboxylate (Nan Ya, Taiwan)
DINP =diisononyl phthalate (VESTINOL 9, from Evonik Operations GmbH)
1,2-DINCH=diisononyl cyclohexane-1,2-dicarboxylate (ELATUR CH, Evonik Operations GmbH)
1,4-DINCH=diisononyl cyclohexane-1,4-dicarboxylate (prepared by ring hydrogenation of diisononyl terephthalate)
DOTP=dioctyl terephthalate (Eastman 168, from Eastman, USA)
DPT=dipentyl terephthalate (Elatur DPT, from Evonik Operations GmbH)
2088=Benzoflex 2088 (mixture of glycol dibenzoates, from Eastman, USA)

Example 2—Determination of Plastisol Viscosity

The viscosity of the plastisols produced in Example 1 was measured with a Physica MCR 101 rheometer (from Anton Paar Germany GmbH) with the aid of the associated software, using the rotation mode and the CC27 measuring system. The measurement was conducted after the plastisols had been equilibrated at 25° C. for 24 hours since their production.

The measurement involved the following points:
preliminary shear at 100 s$^{-1}$ for a period of 60 seconds, during which no measurements were taken
downward shear rate ramp from 200 s$^{-1}$ to 0.1 s$^{-1}$. 30 measurement points were recorded, each with a measurement point duration of 10 seconds.

The measurements were conducted at room temperature. What was determined in each case was the viscosity obtained at a shear rate of 100 s$^{-1}$.

The results of the viscosity measurements for the plastisols produced in Example 1 with the plasticizers or plasticizer mixtures specified in each case are listed in Table 2.

Example 3—Gelation Characteristics

The gelation characteristics of the plastisols were examined in a Physica MCR 101 (from Anton Paar) in oscillation mode with a parallel plate analysis system (PP25) operated under shear stress control. An additional temperature control hood was connected to the system in order to achieve the best possible heat distribution. The following measurement parameters were established:
Mode: Temperature gradient (linear temperature ramp)
Start temperature: 25° C.
End temperature: 180° C.
Heating/cooling rate: 5 K/min
Oscillation frequency: 4-0.1 Hz ramp (logarithmic)
Cycle frequency omega: 10 s$^{-1}$
Number of measurement points: 63
Measurement point duration: 0.5 min
Automatic gap adjustment
Constant measurement point duration
Gap width 0.5 mm
Analysis Procedure:

The spatula was used to apply a few drops of the plastisol to be analyzed, free from air bubbles, to the lower plate of the analysis system. In so doing, it was ensured that, after the analysis system had been assembled, it was possible for some plastisol to exude uniformly out of the analysis system (not more than about 6 mm in any direction). The temperature control hood was subsequently positioned over the sample and the analysis was started. This involved determining what is called the complex viscosity of the plastisol as a function of temperature. Onset of the gelling process was recognised by a sudden sharp rise in the complex viscosity. The earlier the onset of this rise in viscosity, the better the gelation capacity of the system. The measurement curves obtained were used to determine, by interpolation, the temperatures for each plastisol at which a complex viscosity of 1000 Pa*s was measured. The results are listed in Table 2.

Example 4—Film Production

The plastisols produced in Example 1 were each processed to give films of thickness 1 mm.

For this purpose, first of all, high-gloss release paper (from Sappi, Italy) was trimmed to a size of 30×44 cm and inserted in the clamping frame of the LTSV coating installation for the Mathis oven. The clamping frame was subsequently placed onto the guide frame, the Mathis oven (model LTF) was adjusted to 200° C., and the frame was preheated once that temperature had been attained. The coating bar was subsequently inserted into the clamping means and the coating bar gap was adjusted via preliminary experiments such that the film thickness on conclusion of gelation was 1 mm (+/−0.05 mm). The plastisol was spread over the clamped release paper with the aid of the coating bar (speed 3 m/min). Thereafter, the coating bar was removed and the clamping frame was moved into the oven. After gelation (2 minutes at 200° C.), the frame was moved back out of the oven and, after cooling, the film was removed from the paper.

Example 5—Cold Flexibility Via Glass Transition Temperature (DSC)

For the measurement, a small circle (Ø 4.5 mm) was punched out of a PVC film produced from the respective plastisols according to Example 4. This sample was analyzed in an aluminium crucible (perforated crucible lid) under nitrogen with a Mettler Toledo DSC 1 using the following settings:
Dry nitrogen gas: about 45 ml (STP)/min (=standard ml per minute)
Gas nitrogen (purge gas): about 180 ml (STP)/min
Cooling: liquid nitrogen (auxiliary reservoir 1.5 bar)
Method:
[1] 25.0 to 120.0° C., 25.0 K/min
[2] 120.0° C., 5.00 min isothermal
[3] 120.0° C. to −50.0° C., 25.0 K/min
[4] −50.0 to −120.0° C., 10.0 K/min
[5] −120.0° C., 3.00 min isothermal
[6] −120 to 50.0° C., 10.0 K/min
Synchronization switched on The various temperature ramps eliminate the thermal history of the sample and therefore serve for higher reproducibility of the results. For the glass transition, the peak maximum of the first derivative from the ramp [6] was evaluated. The resultant heat flow was plotted as a function of the measurement temperature.

Example 6—Volatility of the Plasticizers in the Films

Three circles per sample were punched out of the PVC films produced in Example 4 with a punch (circle; diameter: 5 cm). The samples were equilibrated in a desiccator for 16 hours.

The sample circles were weighed out on an analytical balance and introduced into a wire basket, and the latter was closed with a bulldog clip.

130 ml of activated carbon were introduced into a tin can (1 l, tall form). The first wire basket with sample was then placed onto the middle of the activated carbon, and a further 130 ml of activated carbon were applied to the sample circle. In total, the tin cans were thus filled layer by layer with 520 ml of activated carbon and 3 wire baskets with sample. Finally, a further upper layer of 130 ml of activated carbon was introduced.

The perforated lid of the tin cans was placed onto the cans without pressure. The filled tin cans were positioned in a heating cabinet heated to 120° C. in such a way that the ventilator in the cabinet was not closed and the cans were not in contact with one another. Air exchange and ventilation flap were each set at 10%. After 72 hours at 120° C., the samples were taken out of the cabinet again and cooled down, then the individual samples were taken out of the baskets, conditioned for another 16 hours in a desiccator and then reweighed on an analytical balance. The resultant difference in mass results from the loss of plasticizer. The average was formed from the three differences in mass in each case, and the percentage loss of plasticizer was calculated. The results are listed in Table 2.

Example 7 - Determination of Shore A Hardness of the Films

For determination of the Shore hardnesses, the plastisols produced in Example 1 were poured into round stainless steel casting moulds having a diameter of 42 mm (weight: 20 g). The pastes were then gelated in the moulds in an air circulation drying cabinet at 200° C. for 25 min, cooled and then removed, and conditioned in a climate-controlled room (25° C.) for at least 16 hours prior to the measurement. The thickness of the test specimens obtained was about 12 mm.

The hardness measurements were conducted in accordance with DIN 53 505 using a Shore A measuring instrument from Zwick-Roell; the measurement was read off after 3 seconds in each case. Measurements were conducted at three different sites on each test specimen, and the average was formed. The results are listed in Table 2.

volatility. Alternatively, it is possible to utilize the high efficiency, expressed by the much lower Shore hardness, for a saving of plasticizer and hence to further reduce emissions.

The glass transition temperature ($T_g$) of the films produced according to Example 4 with 1,4-DEHCH as plasticizer is comparable to films with DINP as plasticizer.

The inventive 1,4-DEHCH, even without the addition of fast gelators, has a value identical to DINP for gelling characteristics according to Example 3. The other plasticizers, 1,2-DINCH, DOTP and 1,4-DINCH, can be adjusted to comparable gelation characteristics only with the aid of a fast gelator (here: DPT). But this also results in a rise, i.e. a deterioration, in volatility (Example 6).

1,4-DINCH does show the lowest volatility of all mixtures, and still has a low viscosity and the best cold flexibilization (Ex. 5), but other properties such as gelation (Example 3) are distinctly worsened. It is not possible here to rely on just one parameter; instead, it is necessary to take account of the overall performance from various parameters.

The inventive plasticizer, 1,4-DEHCH, of all alternatives to DINP, shows the best overall performance with regard to gelation, volatility and efficiency (Shore hardness, viscosity, cold flexibility). Moreover, there is no need for the addition of a fast gelator, which is advantageous for the aforementioned reasons.

TABLE 2

Results of the measurements on Examples 2, 3, 5, 6 and 7

| PM | DINP | 1,2-DINCH | DOTP | 1,4-DINCH | 1,4-DEHCH |
|---|---|---|---|---|---|
| Plastisol viscosity in Pa * s (Ex. 2) | 5.3 | 3.1 | 6.3 | 2.9 | 2.8 |
| T at 1000 Pa * s in ° C. (Ex. 3) | 80 | 90 | 85 | 87 | 80 |
| Tg (Ex. 5) in ° C. | −41 | −47 | −39 | −49 | −43 |
| Volatility from the film after 3 d/120° C. (Ex. 6) | 2.7% | 4.3% | 3.9% | 2.6% | 5.5% |
| Shore A hardness (Ex. 7) | 81 | 84 | 83 | 82 | 77 |

| PM | 1,2-DEHCH | 1,2-DINCH + DPT (2:1) | DOTP + DPT (3:1) | DOTP/2088 5:1 | 1,4-DINCH + DPT (2:1) |
|---|---|---|---|---|---|
| Plastisol viscosity in Pa * s (Ex. 2) | 2.8 | 3.4 | 5.1 | 7 | 3.3 |
| T at 1000 Pa * s (Ex. 3) in ° C. | 83 | 79 | 80 | 77 | 78 |
| Tg (Ex. 5) in ° C. | −41 | −41 | −36 | −33 | −43 |
| Volatility from the film after 3 d/120° C. (Ex. 6) | 9.3% | 10.1% | 6.7% | 4% | 8.5% |
| Shore A hardness (Ex. 7) | 81 | 79 | 79 | 80 | 77 |

The results from Table 2 can be summarized as follows:
The viscosity of the inventive plasticizer, 1,4-DEHCH, is much lower than for DINP. As a result, it is possible to achieve higher filling levels (more fillers) and/or to dispense with the use of viscosity reducers. This is advantageous because it is possible to save additional costs for the use of the viscosity reduces (for example costs for substance, costs for an additional tank for storage of the substance), and it is additionally possible to avoid possible problems resulting from evaporation of the viscosity reducers that typically have a higher

The invention claimed is:

1. A multilayer surface covering comprising at least one layer obtained from a filler-containing PVC plastisol comprising PVC, a filler and a plasticizer composition, and at least one layer obtained from a filler-free PVC plastisol comprising PVC and a plasticizer composition, wherein the plasticizer composition in the filler-containing PVC plastisol and in the filler-free PVC plastisol respectively contains bis(2-ethylhexyl) cyclohexane-1,4-dicarboxylate in a proportion of greater than 50% by weight based on the plasticizer composition.

2. The multilayer surface covering according to claim 1, wherein the PVC in the filler-containing PVC plastisol and in the filler-free PVC plastisol is respectively an emulsion PVC, a (micro) suspension PVC or a mixture of these.

3. The multilayer surface covering according to claim 2, wherein the filler-free PVC plastisol comprises at least an emulsion PVC and a (micro)suspension PVC.

4. The multilayer surface covering according to claim 2, wherein the filler-free PVC plastisol contains the plasticizer composition in a proportion of from 15 to 40 parts by mass per 100 parts by mass of PVC.

5. The multilayer surface covering according to claim 2, wherein the filler-containing PVC plastisol contains the plasticizer composition in a proportion of from 35 to 80 parts by mass per 100 parts by mass of PVC.

6. The multilayer surface covering according to claim 2, wherein the filler-containing PVC plastisol contains the filler in a proportion of from 50 to 200 parts by mass per 100 parts by mass of PVC.

7. The multilayer surface covering according to claim 1, wherein the filler-free PVC plastisol contains the plasticizer composition in a proportion of from 15 to 40 parts by mass per 100 parts by mass of PVC.

8. The multilayer surface covering according to claim 1, wherein the filler-containing PVC plastisol contains the plasticizer composition in a proportion of from 35 to 80 parts by mass per 100 parts by mass of PVC.

9. The multilayer surface covering according to claim 1, wherein the filler-containing PVC plastisol contains the filler in a proportion of from 50 to 200 parts by mass per 100 parts by mass of PVC.

10. The multilayer surface covering according to claim 1, wherein the multilayer surface covering comprises at least one carrier material that has been coated on one or both sides with said filler-containing PVC plastisol to form said at least one layer obtained from the filler-containing PVC plastisol.

11. The multilayer surface covering according to claim 10, wherein the carrier material consists of a polyester fabric, a glass nonwoven, paper or board.

12. The multilayer surface covering according to claim 1, wherein the multilayer surface covering, on its reverse side, includes a foamed layer obtained from a foamable PVC plastisol.

13. The multilayer surface covering according to claim 7, wherein the foamable PVC plastisol comprises PVC, a plasticizer composition, a filler, a blowing agent and a kicker, and optionally an additive for lowering the viscosity.

14. The multilayer surface covering according to claim 13, comprising said at least one layer obtained from said filler-containing PVC plastisol that comprises PVC, a filler and a plasticizer composition, a carrier material that has been coated on one or both sides with said filler-containing PVC plastisol to form said at least one layer obtained from said filler-containing PVC plastisol, said at least one layer obtained from said filler-free PVC plastisol that comprises PVC and a plasticizer composition being disposed as an upper layer of the multilayer surface covering, and the at least one said foamed layer disposed below said carrier material, wherein the plasticizer composition in each of the PVC plastisols used contains bis (2-ethylhexyl) cyclohexane-1,4-dicarboxylate.

15. The multilayer surface covering according to claim 14, wherein the multilayer surface covering additionally also comprises a scratch-resistant layer that consists of polyurethane or polyacrylate and is transparent.

16. The multilayer surface covering according to claim 14 wherein said at least one layer obtained from said filler-free PVC plastisol is transparent.

17. The multilayer surface covering according to claim 12, wherein the foamed layer obtained from a foamable PVC plastisol contains the filler in a proportion of from 70 to 200 parts by mass per 100 parts by mass of PVC.

18. The multilayer surface covering according to claim 12, wherein the foamed layer obtained from a foamable PVC plastisol contains the plasticizer in a proportion of from 40 to 80 parts by mass per 100 parts by mass of PVC.

19. A floor covering comprising the multilayer surface covering according to claim 1.

20. An imitation leather comprising the multilayer surface covering according to claim 1.

21. A multilayer surface covering comprising:
at least one layer obtained from a filler-containing PVC plastisol comprising PVC, a filler and a plasticizer composition, and
at least one layer obtained from a filler-free PVC plastisol comprising PVC and a plasticizer composition,
wherein the plasticizer composition in said filler-containing PVC plastisol and in said filler-free PVC plastisol respectively contains bis(2-ethylhexyl) cyclohexane-1, 4-dicarboxylate in a proportion of greater than 50% by weight based on the plasticizer composition,
wherein said at least one layer obtained from the filler-free PVC plastisol is an upper transparent layer of the multilayer surface and said at least one layer obtained from said filler-containing PVC plastisol is a lower layer of the multilayer surface.

22. The multilayer surface covering according to claim 21, wherein the multilayer surface covering comprises at least one carrier material that has been coated on one or both sides with said filler-containing PVC plastisol to form said at least one layer obtained from said filler-containing PVC plastisol.

* * * * *